US010114202B2

(12) United States Patent
Lim

(10) Patent No.: US 10,114,202 B2
(45) Date of Patent: Oct. 30, 2018

(54) DUAL PURPOSE MICROSCOPE

(71) Applicant: Hayong E. Lim, San Marino, CA (US)

(72) Inventor: Hayong E. Lim, San Marino, CA (US)

(*) Notice: Subject to any disclaimer, the term of this patent is extended or adjusted under 35 U.S.C. 154(b) by 0 days.

(21) Appl. No.: 15/630,240

(22) Filed: Jun. 22, 2017

(65) Prior Publication Data

US 2018/0003935 A1  Jan. 4, 2018

Related U.S. Application Data

(60) Provisional application No. 62/356,800, filed on Jun. 30, 2016.

(51) Int. Cl.
*G02B 21/00* (2006.01)

(52) U.S. Cl.
CPC ....... *G02B 21/0004* (2013.01); *G02B 21/008* (2013.01); *G02B 21/0016* (2013.01); *G02B 21/0032* (2013.01); *G02B 21/0036* (2013.01); *G02B 21/0052* (2013.01); *G02B 21/0088* (2013.01)

(58) Field of Classification Search
None
See application file for complete search history.

(56) References Cited

U.S. PATENT DOCUMENTS

| 4,128,944 A * | 12/1978 | Stanton | G02B 21/32 |
| | | | 359/376 |
| 4,784,481 A * | 11/1988 | Wuerfel | A61K 51/0476 |
| | | | 359/375 |
| 9,140,885 B2 | 9/2015 | Cho et al. | |
| 2002/0080240 A1 | 6/2002 | Omi | |
| 2007/0146872 A1 | 6/2007 | Bocher et al. | |
| 2014/0168403 A1 | 6/2014 | Winterot et al. | |

FOREIGN PATENT DOCUMENTS

JP    2011027906 A    10/2011

* cited by examiner

*Primary Examiner* — Derek S Chapel
(74) *Attorney, Agent, or Firm* — Steinfl + Bruno, LLP

(57) ABSTRACT

A microscope that comprises a unibody core having a unibody front and a unibody side, a carrier ring rotatably coupled to said unibody front to rotate components from an upright to an inverted configuration, wherein said carrier ring has the general form of a torus, an objective turret coupled within said carrier ring, a condenser lens coupled within said carrier ring, gliding rails coupled to said unibody core, a camera coupled to said unibody core, a gliding stage extensibly coupled to said gliding rails and an attachment node coupled to said unibody side and moveably coupled to said gliding rails to modulate said gliding stage.

20 Claims, 25 Drawing Sheets

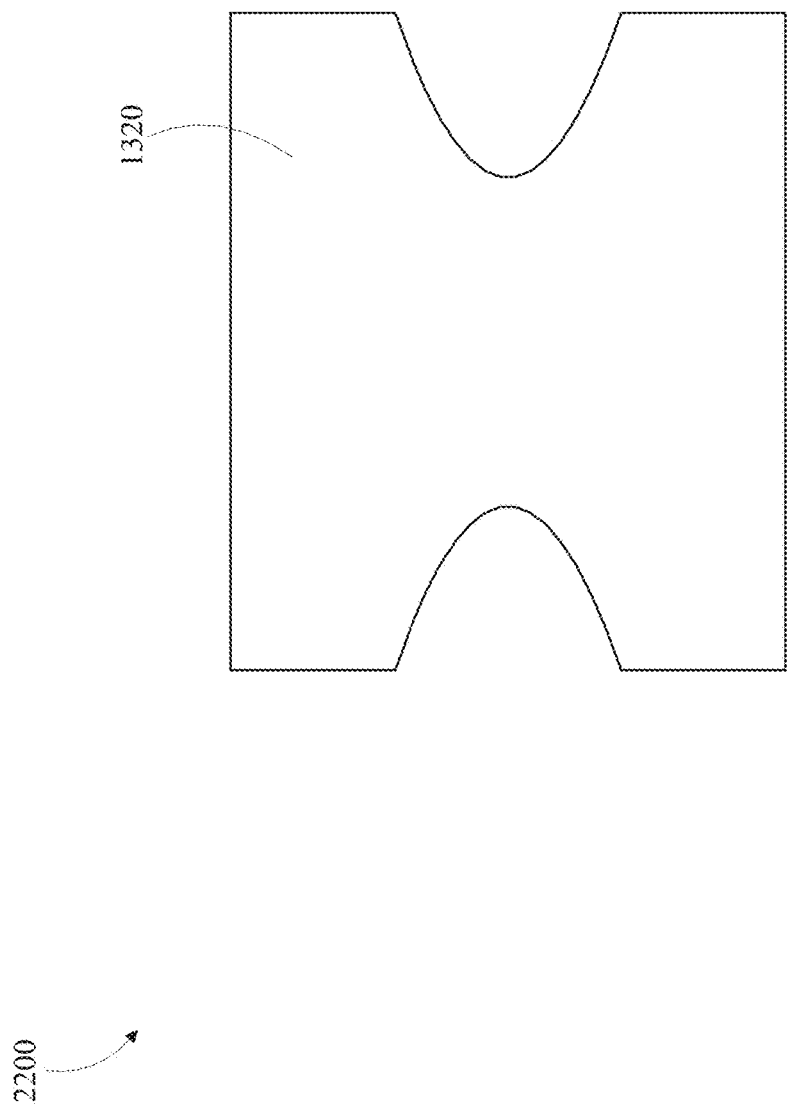

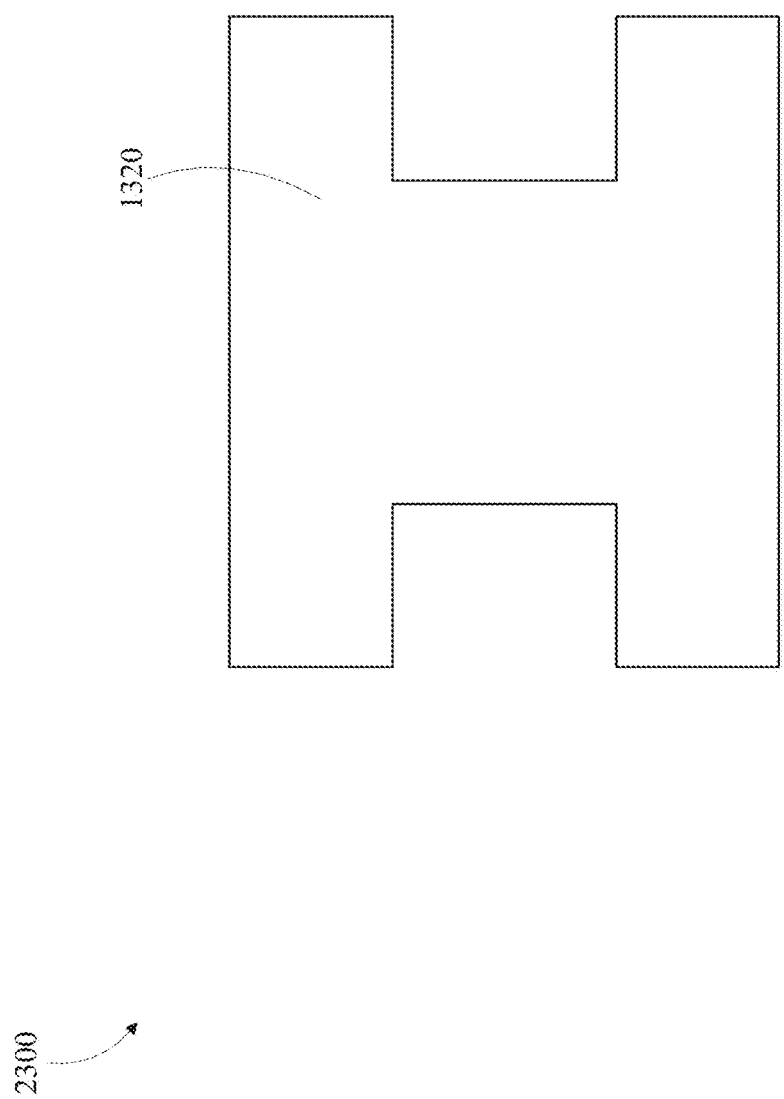

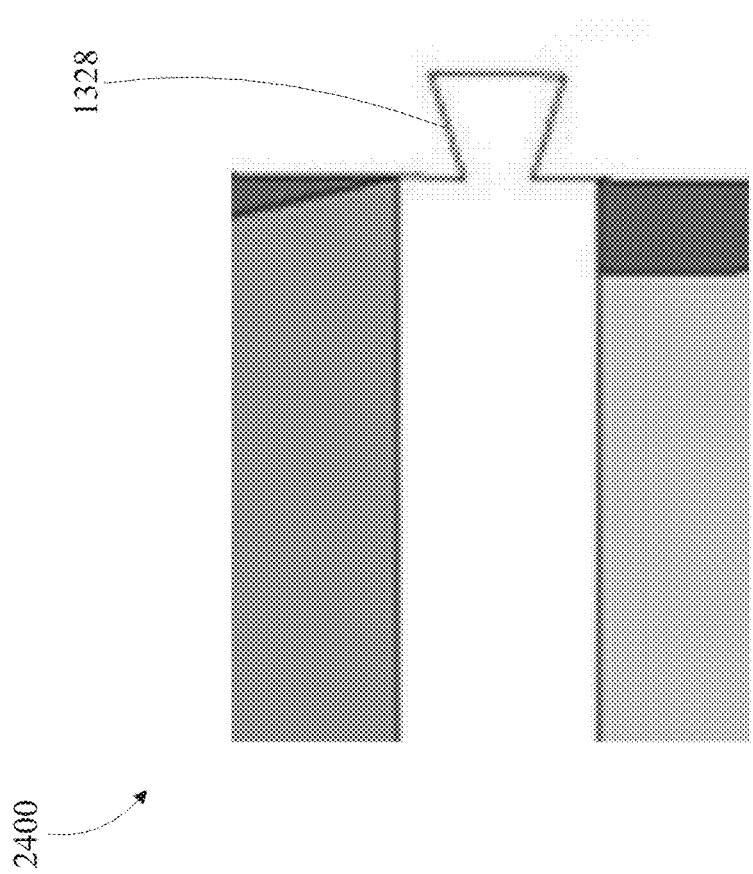

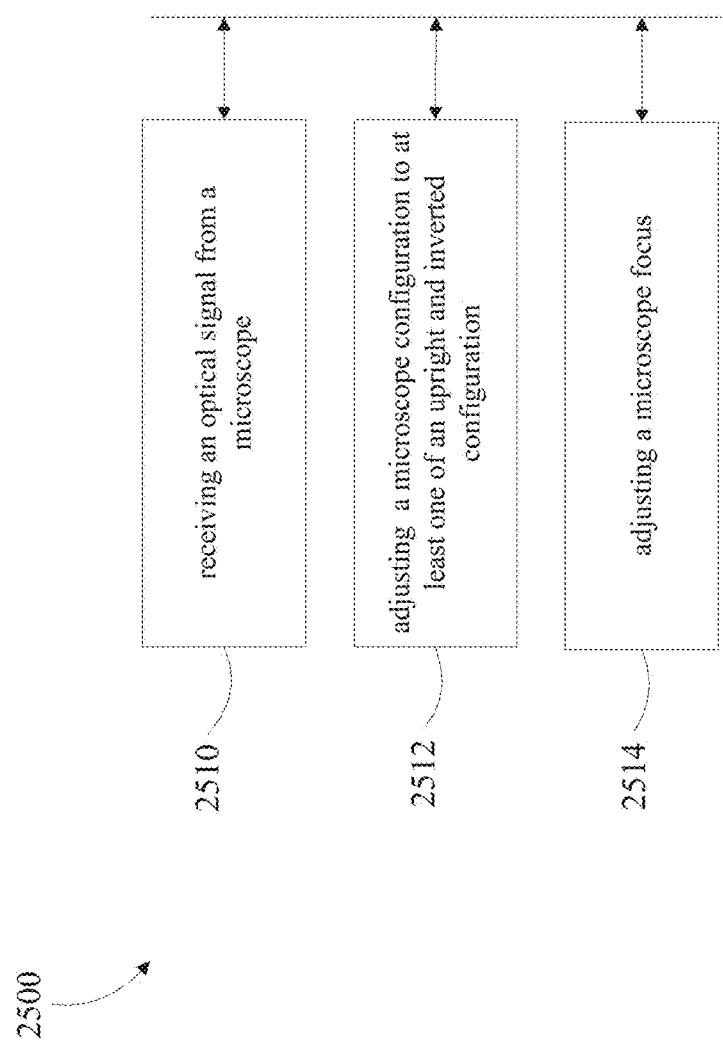

US 10,114,202 B2

DUAL PURPOSE MICROSCOPE

CROSS REFERENCE TO RELATED APPLICATIONS

The present application claims priority to U.S. Provisional Patent Application No. 62/356,800, filed on Jun. 30, 2016, the disclosure of which is incorporated herein by reference in its entirety.

TECHNOLOGY

The present disclosure relates generally to microscopes. More particularly, an embodiment of the present disclosure relates to dual purpose microscopes.

BRIEF DESCRIPTION OF THE DRAWINGS

An embodiment of the instant disclosure is illustrated by way of example, and not in way by limitation, in the figures of the accompanying drawings and in which like reference numerals refer to similar elements and in which:

FIG. 22 depicts a gliding stage with oval cutouts in accordance with an embodiment of the disclosure;

FIG. 23 depicts a gliding stage with rectangular cutouts in accordance with an embodiment of the disclosure; and FIG. 24 depicts a method of dual purpose microscopy in accordance with an embodiment of the disclosure.

FIG. 25 depicts a method of microscopy in accordance with the present disclosure.

SUMMARY

In a first aspect of the disclosure, a microscope that comprises a unibody core having a unibody front and a unibody side, a carrier ring rotatably coupled to said unibody front to rotate components from an upright to an inverted configuration, wherein said carrier ring has the general form of a torus, an objective turret coupled within said carrier ring, a condenser lens and LED light source coupled within said carrier ring, gliding rails coupled to said unibody core, a camera coupled to said unibody core, a gliding stage extensibly coupled to said gliding rails and an attachment node coupled to said unibody side and moveably coupled to said gliding rails to modulate said gliding stage.

In a second aspect of the disclosure, a microscope that comprises a static ring having a static ring front and a static ring side, a carrier ring rotatably coupled to the static ring front to rotate components from an upright to an inverted configuration, wherein the carrier ring has the general form of a torus, an optics module coupled within the carrier ring, gliding rails coupled to the static ring, a gliding stage extensibly coupled to the gliding rails and an attachment node coupled to the static ring and moveably coupled to the gliding rails to modulate the gliding stage.

In a third aspect of the disclosure, a method of microscopy that comprises receiving an optical signal from a microscope, adjusting a microscope configuration to at least one of an upright and inverted configuration and adjusting a microscope focus.

In a fourth aspect of the disclosure, a microscope that comprises a unibody core having a unibody front and a unibody side, a carrier ring rotatably coupled to the unibody front to rotate components from an upright to an inverted configuration, wherein the carrier ring has the general form of a torus, an objective turret coupled to the carrier ring, a condenser lens coupled to the carrier ring, gliding rails coupled to the unibody core, a camera coupled to the unibody core, a gliding stage extensibly coupled to the gliding rails and an attachment node coupled to the unibody side and moveably coupled to the gliding rails to modulate the gliding stage.

DESCRIPTION OF EXAMPLE EMBODIMENTS

Figure 1:
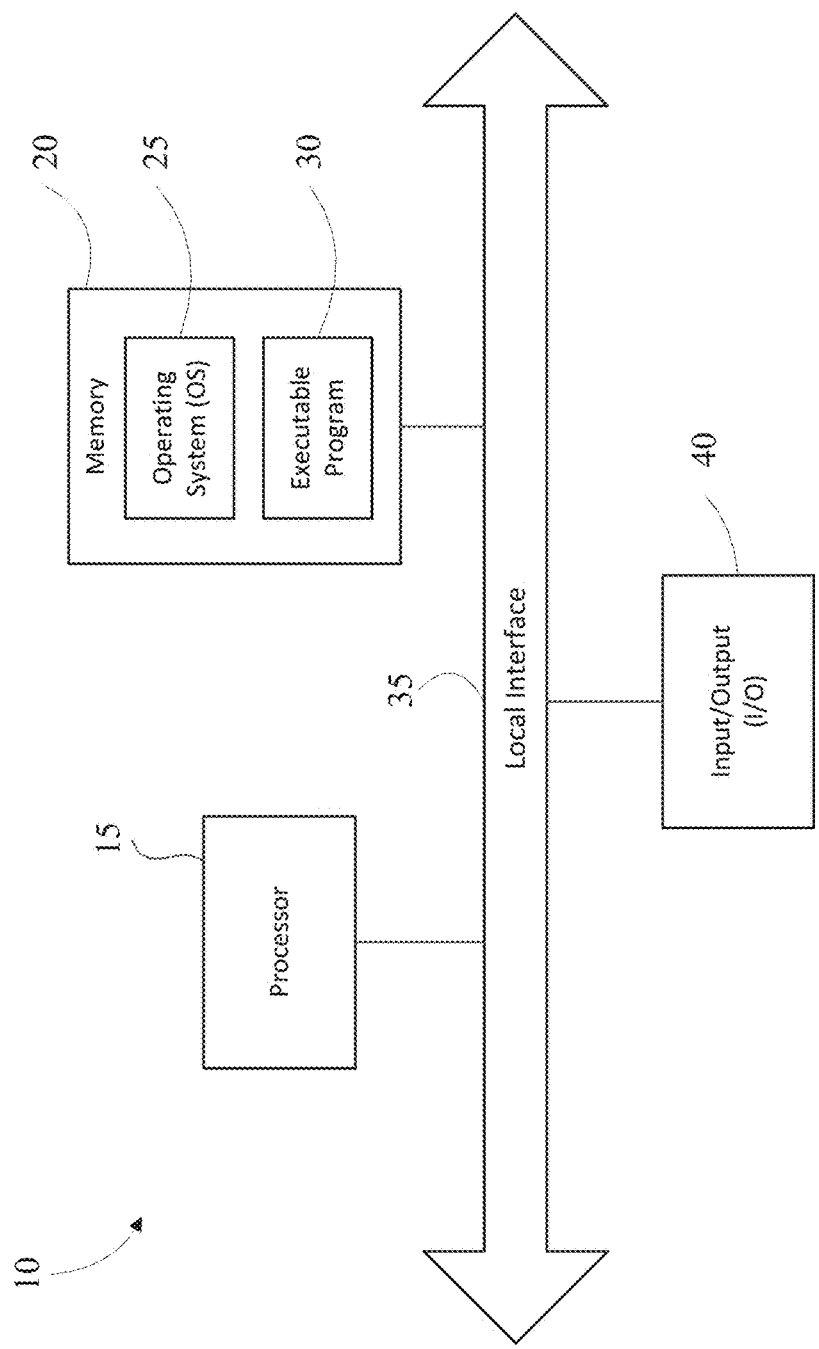
FIG. 1 depicts a first example computer hardware embodiment.

FIG. 1 depicts a first exemplary embodiment of target hardware for implementation of an embodiment of the present disclosure.

FIG. 1 is an exemplary embodiment of a target hardware (10) (e.g., a computer system) for implementing the embodiments of FIG. 1. This target hardware comprises a processor (15), a memory bank (20), a local interface bus (35) and one or more Input/Output devices (40). The processor may execute one or more instructions related to the implementation of FIG. 1, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it may store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a Universal Serial Bus (USB) flash drive. In some embodiments, the operating system (25) facilitates these tasks by being the central element to gathering the various data and instructions required for the execution of the program and provide these to the microprocessor. In some embodiments the operating system may not exist, and tasks are under direct control of the processor (15), although the basic architecture of the target hardware device (10) will remain the same as depicted in FIG. 1. In some embodiments a plurality of processors may be used in a parallel configuration for added execution speed. In such a case, the executable program may be specifically tailored to a parallel execution. Also, in some embodiments the processor (15) may execute part of the implementation of FIG. 1, and some other part may be implemented using dedicated hardware/firmware placed at an Input/Output location accessible by the target hardware (10) via local interface (35). The target hardware (10) may include a plurality of executable programs (30), which may run independently or in combination with one another.

The instant disclosure describes a dual-purpose, light microscope configured as either an upright or an inverted microscope.

The microscope comprises a unibody core, a spinning carrier ring, a complementary flanged coupling, a gliding stage, a pair of gliding rails, a power base and attachment nodes.

The unibody core consists of an internal frame assembly and external enclosed case with a closed back. The unibody core contains an internal frame assembly comprising optical components, filter cubes, light cubes, light guides, and cameras, detectors and the like.

The spinning carrier ring consists of a triangular armature enclosed in a case that contains an objective turret, condenser lens assembly, and a Light Emitting Diode (LED) light source within. The spinning carrier ring spins about and proximate to the unibody core and is coupled to the unibody core by way of a complementary flanged coupling. The spinning carrier ring consists of objective turret condenser lens, LED and may spin to upright or inverted configurations.

The rotation of the carrier ring occurs about a rotatable coupling on the unibody core. The carrier rotates the entire optical assembly, thus maintaining a reduced occupation of space during the rotation. The sliding of the gliding stage before rotation and after rotation allows the stage to retain its top datum regardless of upright or inverted stage status.

The complementary flanged coupling consists of complementary flanged ring connectors and an O-ring seal that permits the spinning carrier ring assembly 180 degrees of spinning motion relative to the unibody core. The outer flanged ring connector attaches to the spinning carrier ring and the inner flanged ring connector attaches to the unibody core.

The gliding stage consists of a specimen slide holder and fitment that can accommodate a well plate adapter. The gliding stage can be adjusted vertically to accommodate the relative working distances of objectives of varying numerical aperture and to facilitate coarse/fine focus of specimen on image plane. The gliding stage is connected to the unibody core by way of gliding rails.

The gliding stage couples to unibody on gliding rails, displaces horizontally by way of gliding rails and adjusts vertically to facilitate image focus. The gliding stage displaces horizontally on sliding dovetail gliding rails and couples to unibody core on these gliding rails that allow gliding stage to slide back and forth. Additionally, the sliding stage may have cutouts that allow the spinning carrier ring to rotate about the stage. The gliding stage slides forward on gliding rails during reconfiguration to permit unobstructed movement of spinning carrier ring.

The power base is an enclosed stand that contains the electronic controller board and power source of the system to power the LEDs, cameras, detectors, wireless or wired communication and the like.

The attachment nodes consist of a spherical inner knob and cylindrical outer ring that are positioned on either side of the unibody core between the spinning carrier ring and power base. The right attachment node actuates the coarse/fine focus of the microscope by vertically adjusting the gliding stage. The left attachment node acts as the holding bracket, digital connector, and power adapter for a tablet computing device. The attachment nodes have a vertical stage adjuster, a tablet holding bracket and a tablet digital connector and power adapter. The attachment node couples to tablet controller or image viewer and acts as coarse and fine focus.

The tablet computing device receives camera and/or detector output signal by way of a cable, such as a lightning connector, physical light, or wireless connection. The tablet computing device is the primary specimen image viewer for the microscope, wherein the tablet computing device is the main control interface for image acquisition and is the image archive buffer of the system. The tablet computing device can subsequently send the acquired images to any number of online data storage services with the aid of their respective application programming interface (API).

In the direct lighting example, a light pipe routes the optical signal from the microscope to a port for reception by a camera on a portable device such as a tablet or smartphone.

In a wired connection, it is envisioned that an output such as a USB Type-C or the like may be wired to a lightning connector or other USB type connection for data exchange.

The microscope comprises a spinning carrier ring, an upright and inverted configuration and optics.

The tablet computing device has a microscope image viewer and a system controller interface.

The LED light source is for bright-field views and has a condenser lens assembly. The optical assembly contained within the unibody core and the imaging module in the double ring examples may be used for epifluorescence.

The flanged coupling consists of complementary flanged ring connectors and O-ring seal. The outer flanged ring connector attaches to the carrier ring and the inner flanged ring connector attaches to the unibody.

EXAMPLES

Figure 2:
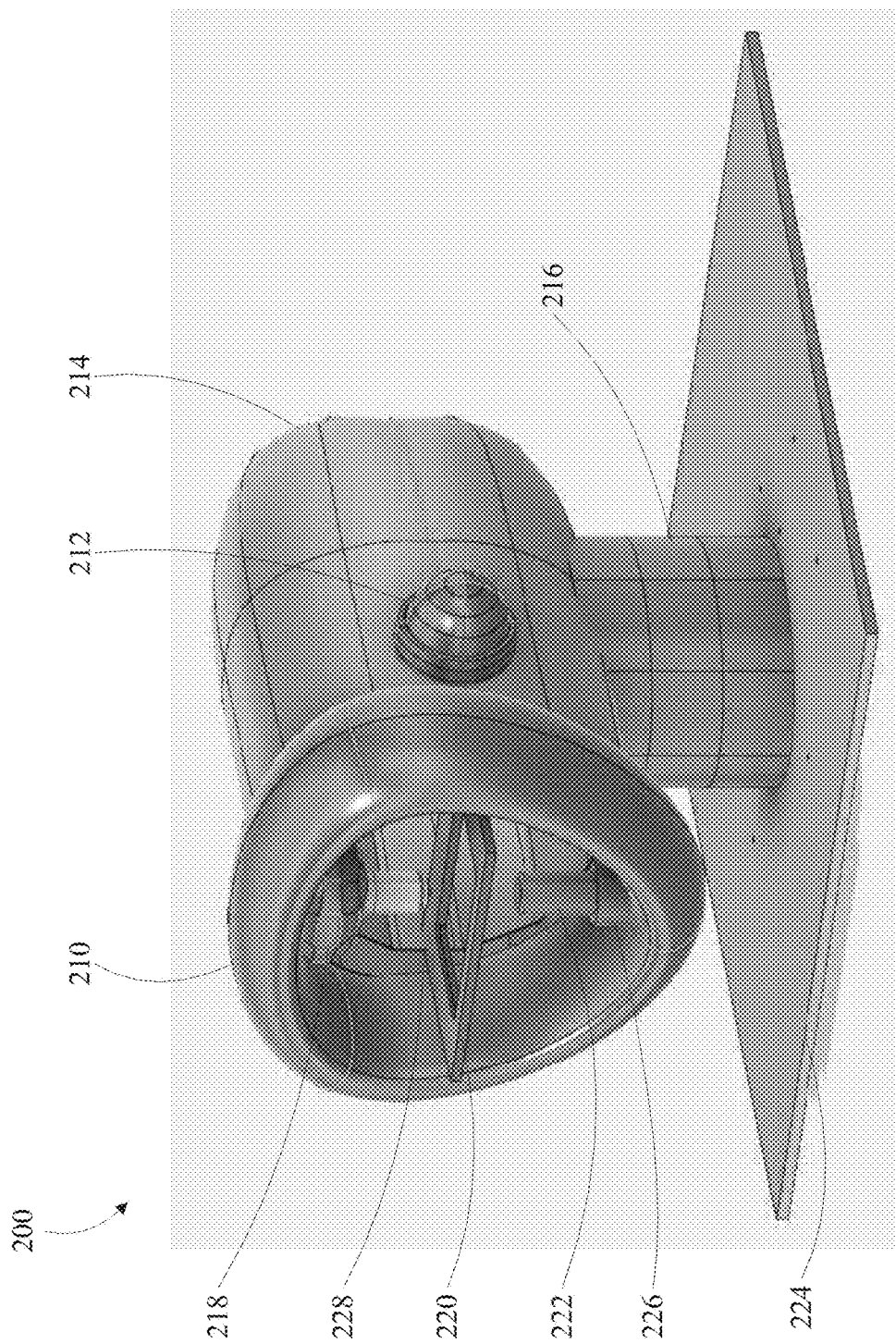
FIG. 2 depicts a perspective view of a dual purpose microscope in accordance with an embodiment of the disclosure.

FIG. 2 depicts a carrier ring 210 that spins and is coupled to an objective turret 218, an LED light source 226 and a condenser lens assembly 222 within the carrier ring. The carrier ring has the general shape of a torus having an outline of a smooth reuleaux triangle. The outline of the carrier ring may be any closed geometric shape. The device also has a base 224 and a power base 216. The unibody core 214 consists of an internal frame assembly and external enclosed case. The unibody core contains optics filter cubes, light cubes, light guides, cameras/detectors and the attachment nodes 212 consist of a spherical inner knob and cylindrical outer ring that are positioned on either side of the unibody core between the spinning carrier ring 210 and the power base 216. The power base 216 is coupled to a stand 224. The gliding stage 220 is coupled to the unibody core and is manipulated by the attachment nodes 212.

In the example of FIG. 2, the gliding stage may extend forward from the spinning carrier ring during reconfiguration to avoid obstructing the optics.

An X-Y stage manipulator may also be coupled to the sliding stage to manipulate the position of the viewed sample. The X-Y stage manipulator may be manual or powered and controllable by an external controller such as a tablet, mobile phone or the like.

Figure 3:
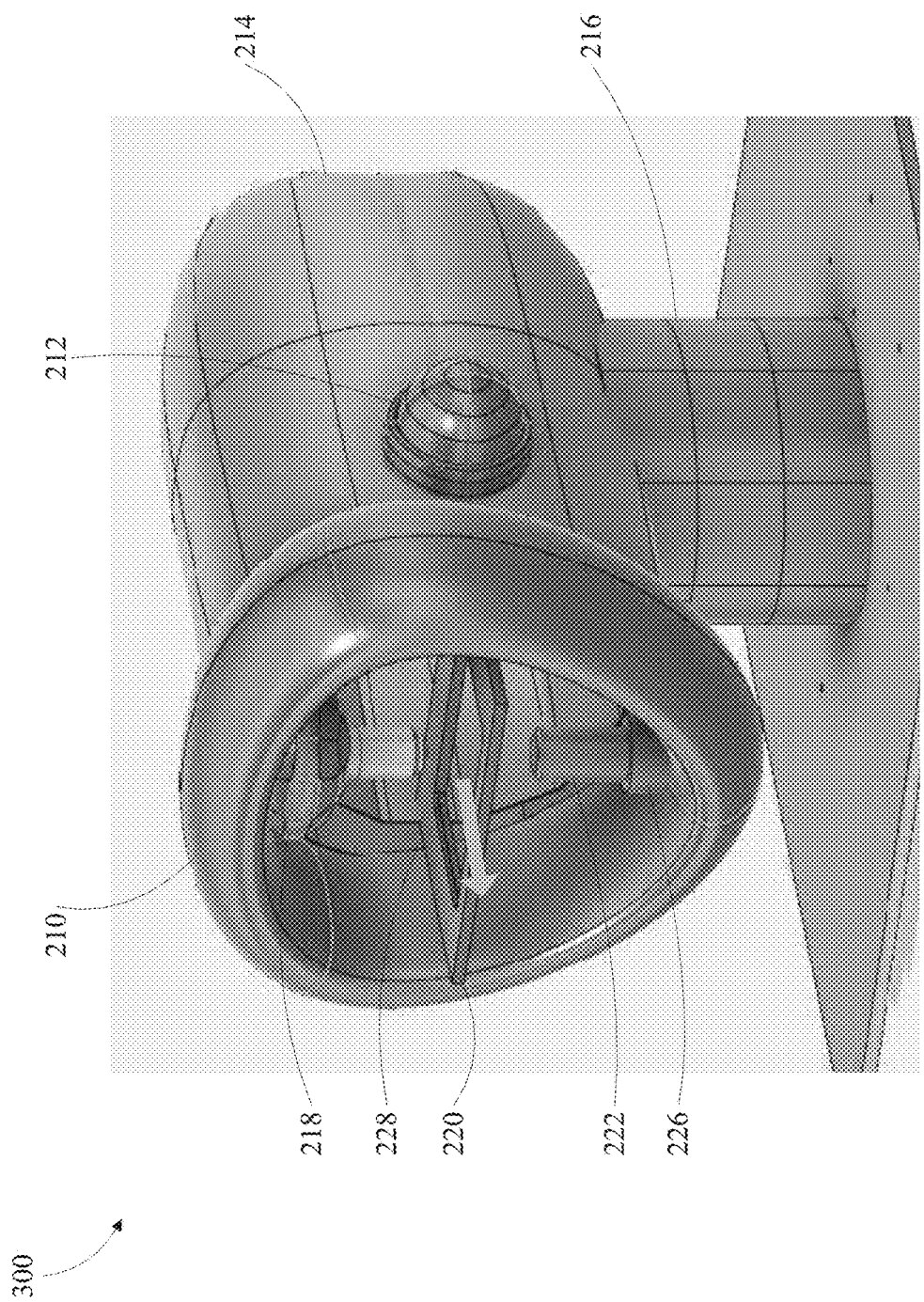
FIG. 3 depicts an enlarged perspective view of a dual purpose microscope in accordance with an embodiment of the disclosure.

FIG. 3 depicts a unibody core 214, a spinning carrier ring 210, a gliding stage 220, a pair of gliding rails 228, a power base 216, attachment nodes 212 and the objective turret 218. In this example the gliding stage 220 extends forward during rotation of the carrier ring 210.

Figure 4:
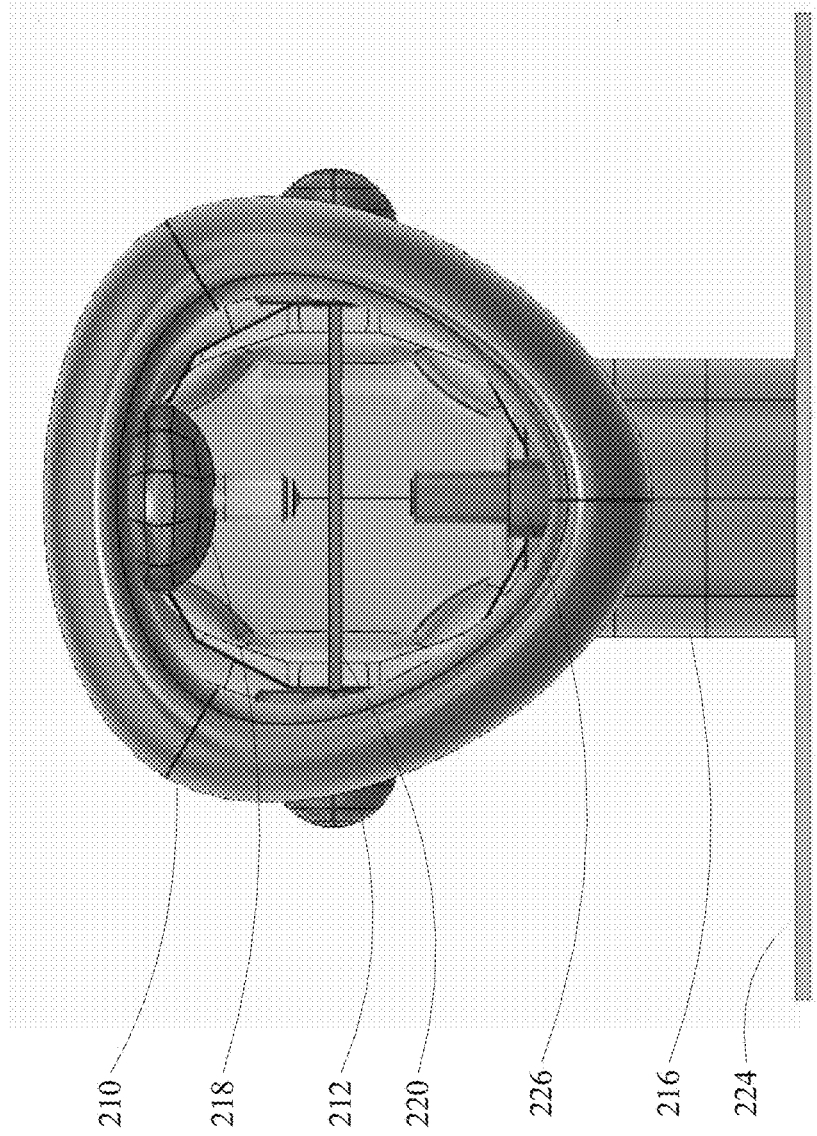
FIG. 4 depicts a front view of a dual purpose microscope in accordance with an embodiment of the disclosure.

FIG. 4 depicts a carrier ring 210 that spins and is coupled to an objective turret 218, a gliding stage 220 and an LED light source 226 which are contained within the carrier ring. The device also has a base 224 and a power base 216. The unibody core 214 consists of an internal frame assembly and external enclosed case. The unibody core contains attachment nodes 212 that consist of a spherical inner knob and cylindrical outer ring that are positioned on either side of the unibody core between the spinning carrier ring and power base to modulate the stage 220 upward and downward.

Figure 5:
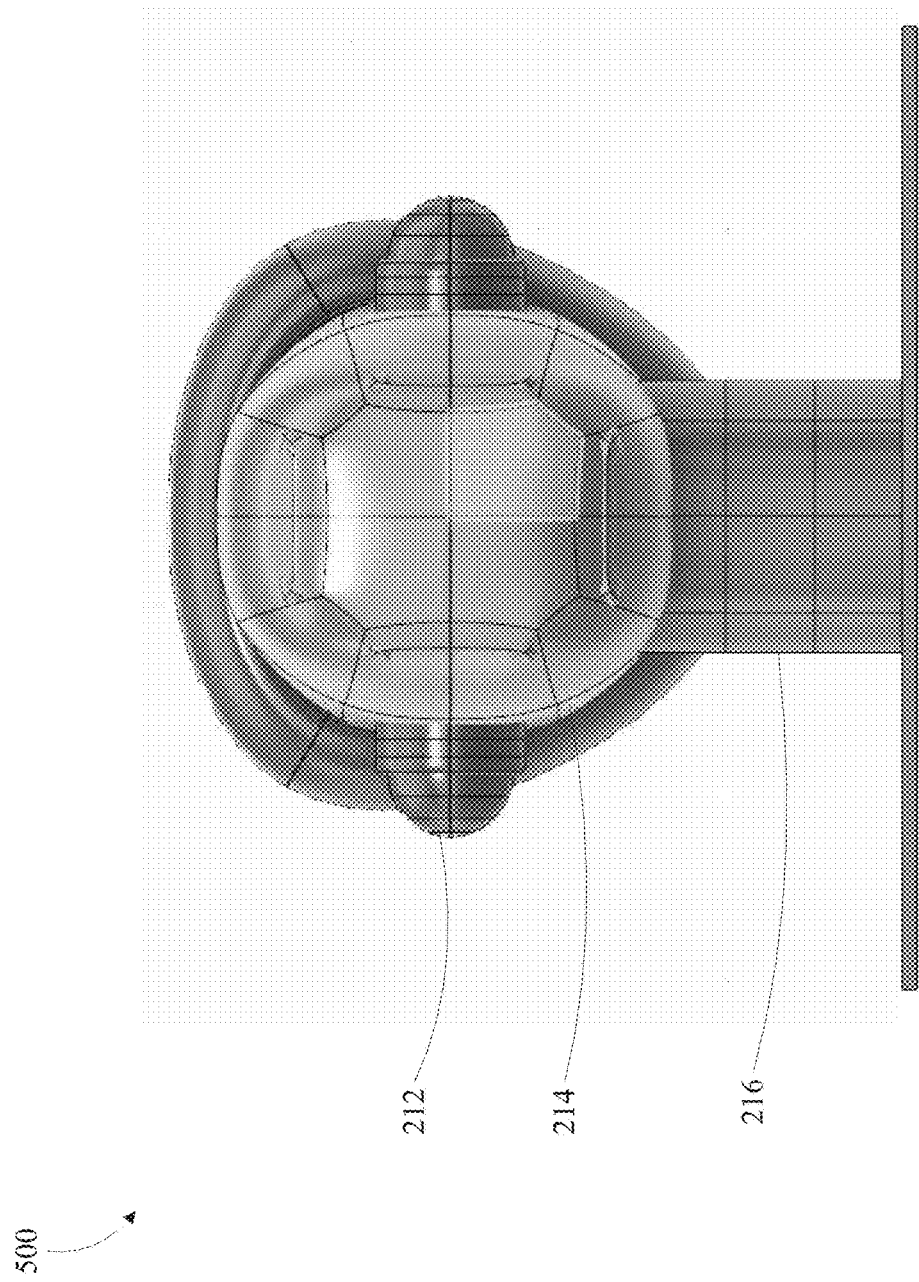
FIG. 5 depicts a rear view of a dual purpose microscope in accordance with an embodiment of the disclosure.

FIG. 5 shows the device from the rear showing the attachment nodes 212, the unibody core 214 and the power base 216.

Figure 6:
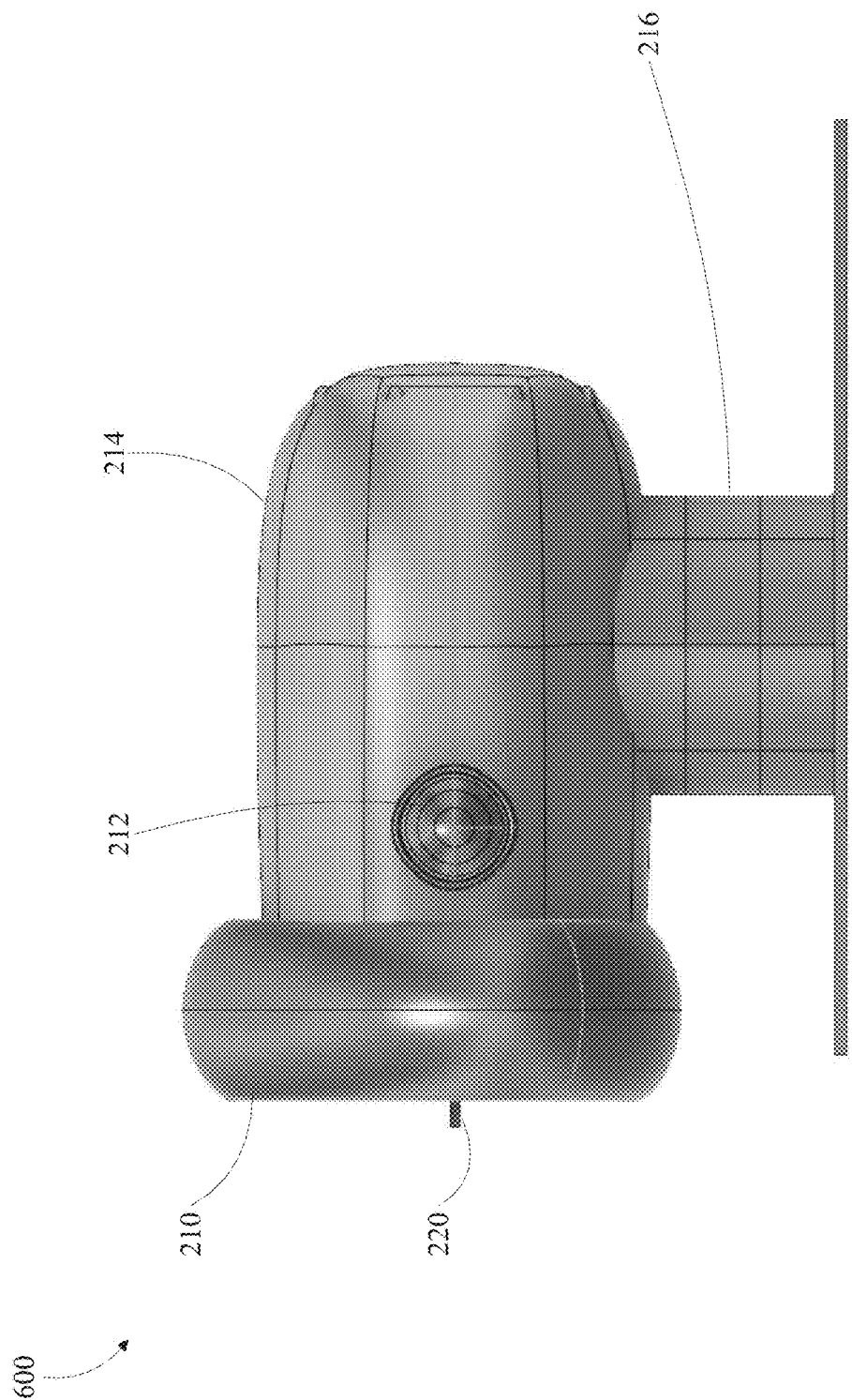
FIG. 6 depicts a side view of a dual purpose microscope in accordance with an embodiment of the disclosure.

FIG. 6 shows the device from the side showing the gliding stage 220, the spinning carrier ring 210, the attachment nodes 212, the unibody core 214 and the power base 216.

Figure 7:
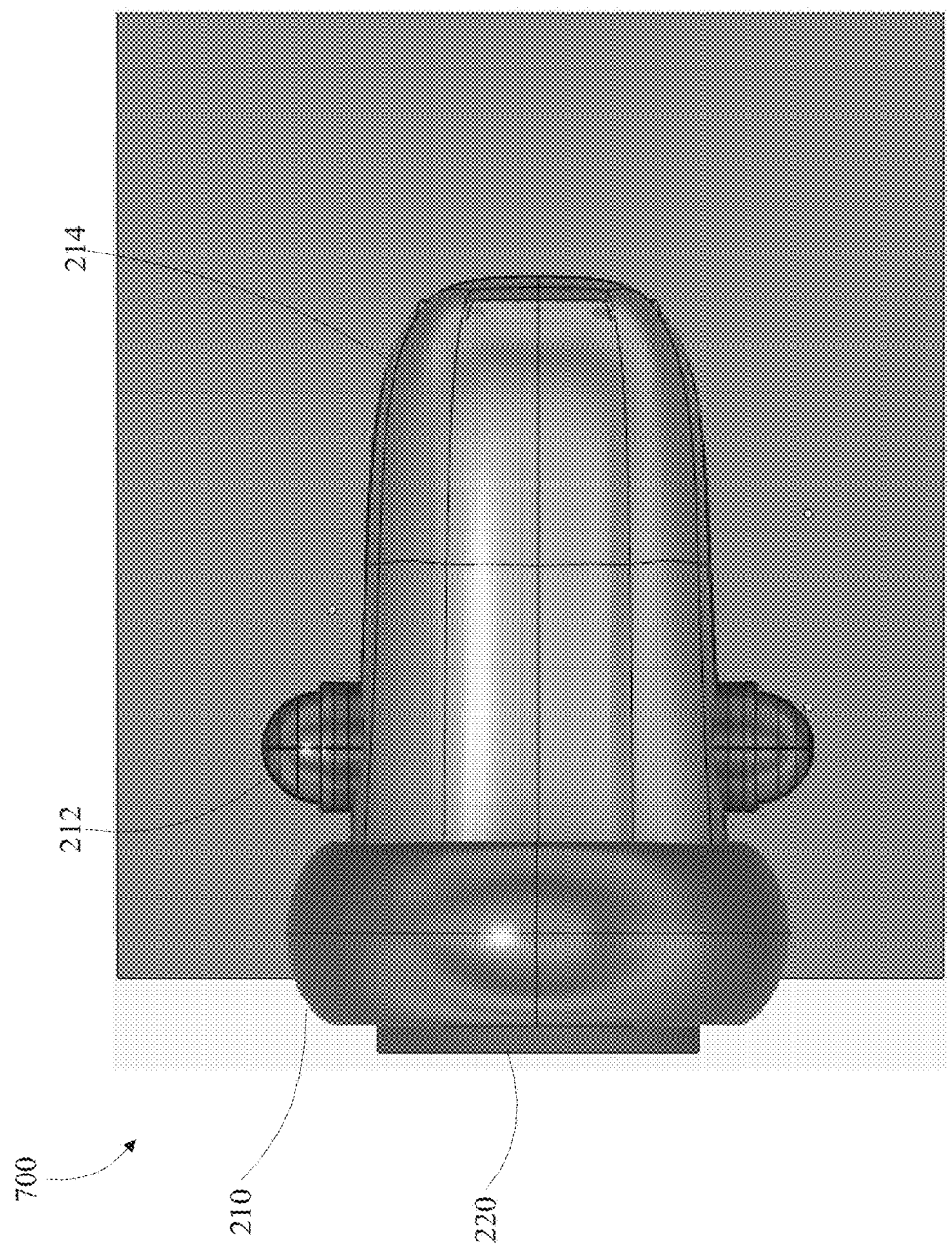
FIG. 7 depicts a top view of a dual purpose microscope in accordance with an embodiment of the disclosure.

FIG. 7 shows the device from the top showing the gliding stage 220, the spinning carrier ring 210, the attachment nodes 212 and the unibody core 214.

Figure 8C:
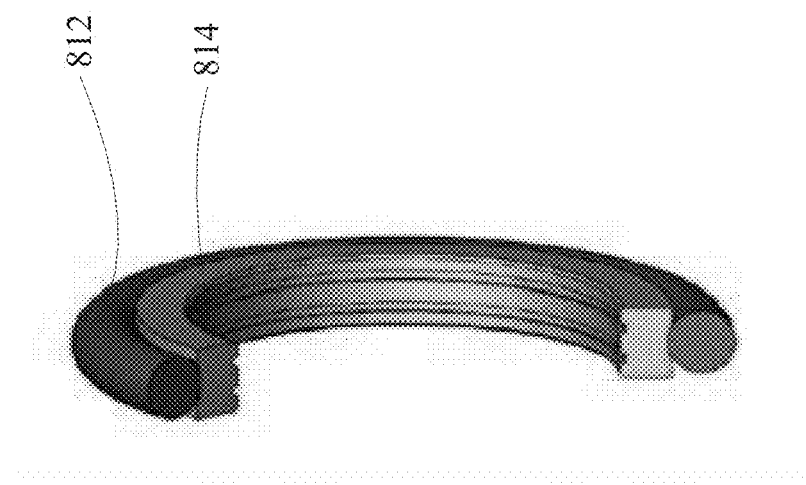
FIG. 8A-8C depicts an O-ring coupling in accordance with an embodiment of the disclosure.
Figure 8B:
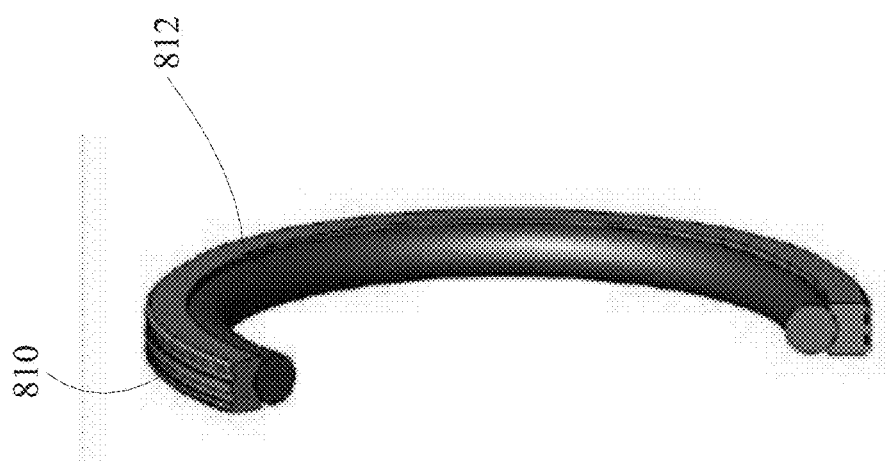
Figure 8A:
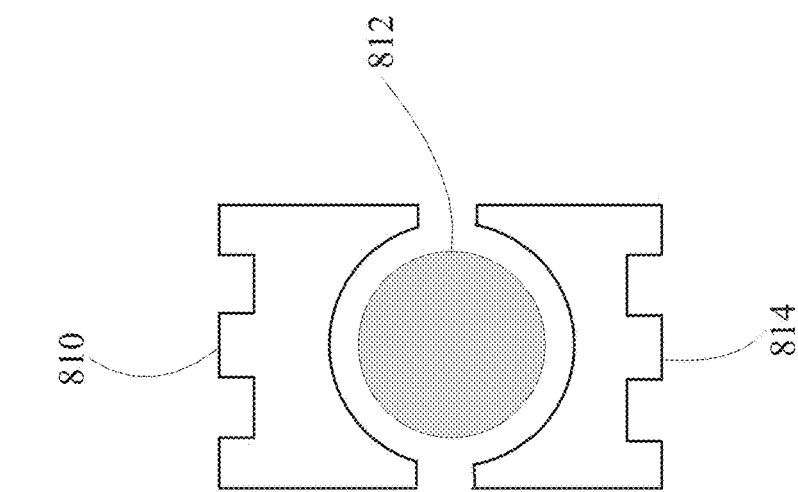

FIG. 8 depicts a complementary flanged coupling 800 having a complementary outer flanged ring connector 810 connected to the carrier ring, O-ring seal 812 and inner flanged ring connector 814 connected to the unibody or static ring.

Figure 9:
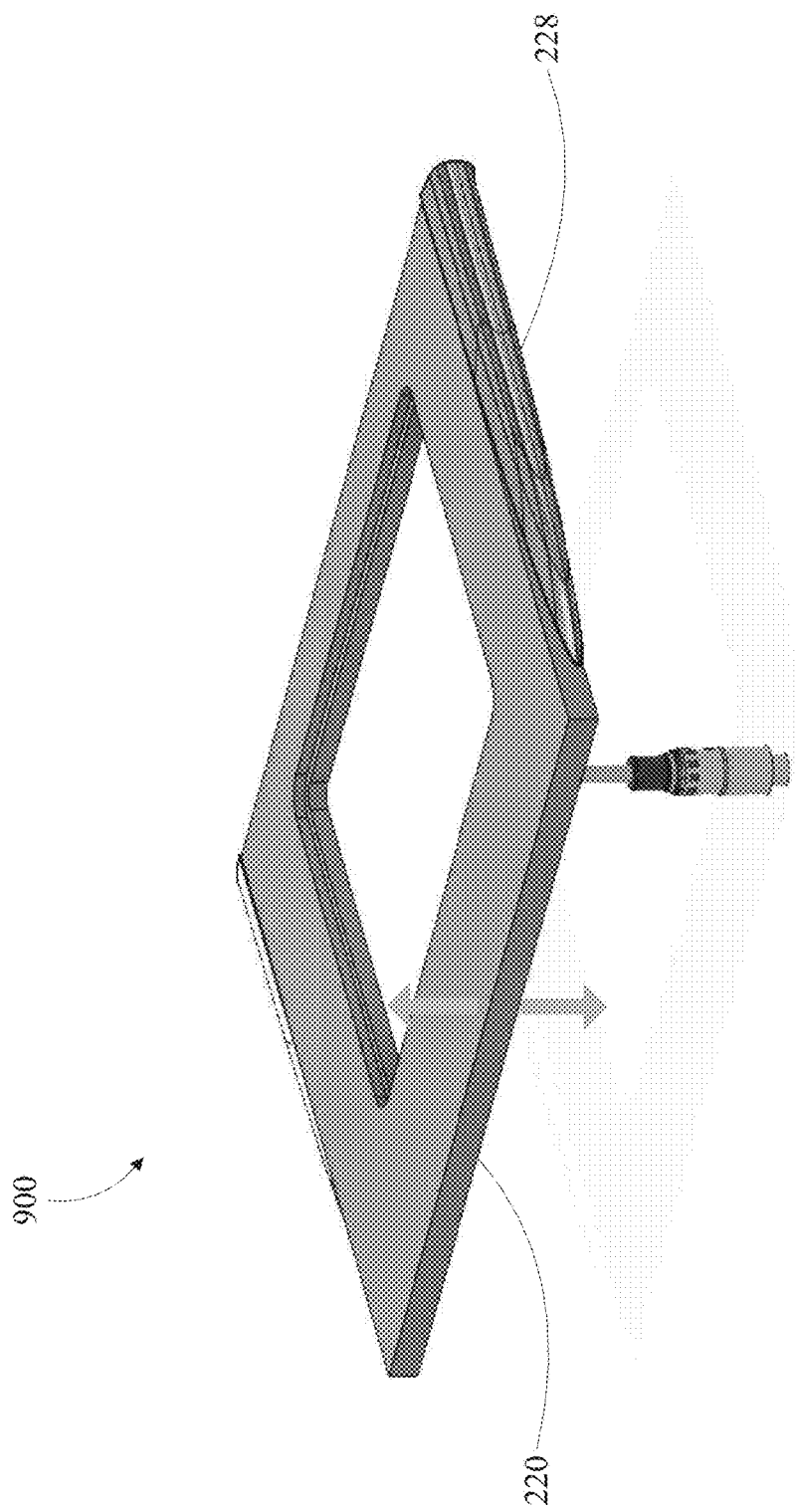
FIG. 9 depicts a gliding stage and gliding rails in accordance with an embodiment of the disclosure.

FIG. 9 depicts an example of the gliding stage 220 and the gliding rails 228 with the gliding stage in a retracted state. The gliding rails comprise sliding dovetail rail guides connected to a focus mechanism.

Figure 10:
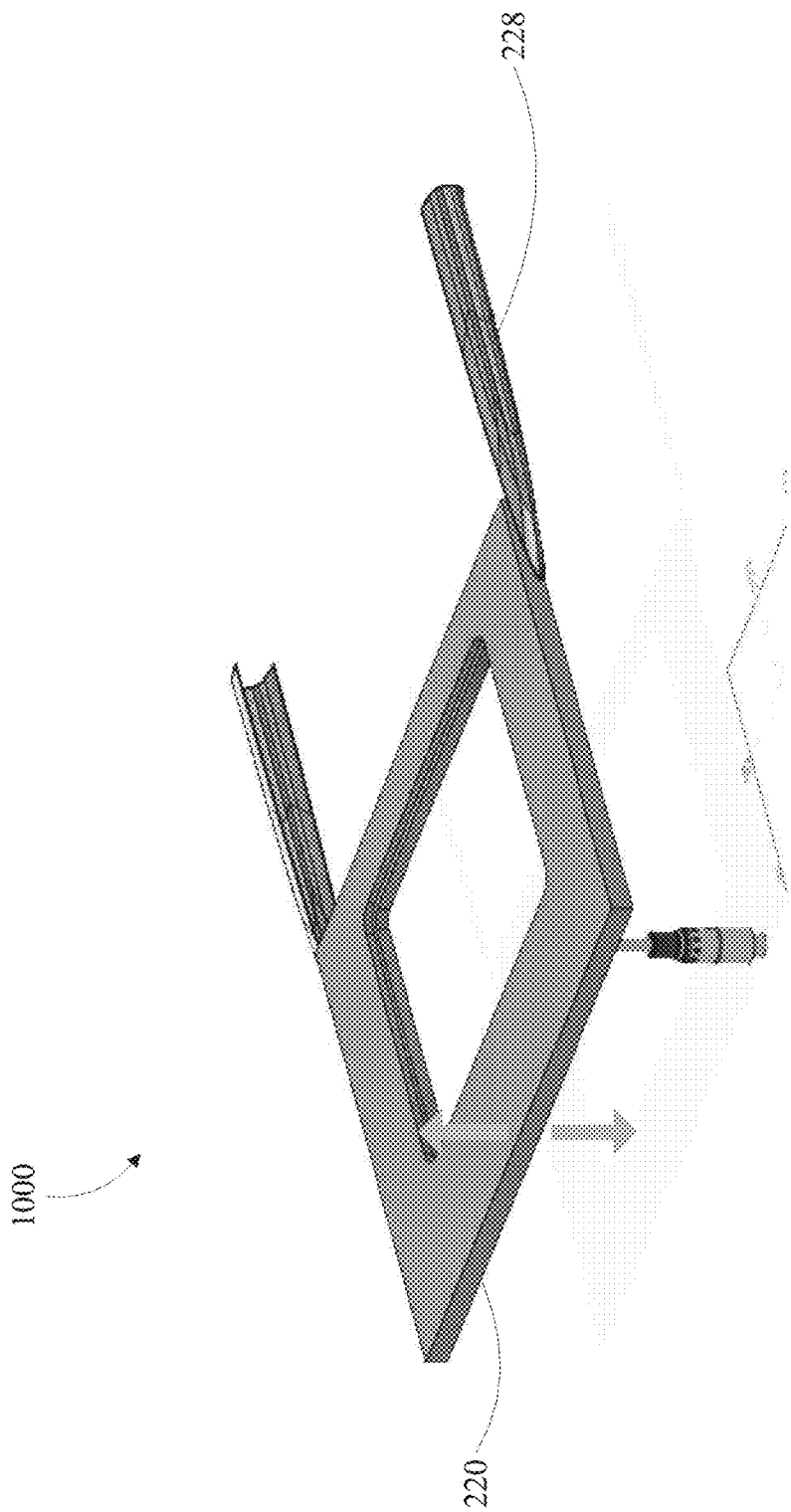
FIG. 10 depicts a gliding stage and gliding rails in accordance with an embodiment of the disclosure.

FIG. 10 depicts an example of the gliding stage 220 and the gliding rails 228 with the gliding stage in an extended state. The gliding stage slides horizontally during carrier ring configuration.

Figure 11:
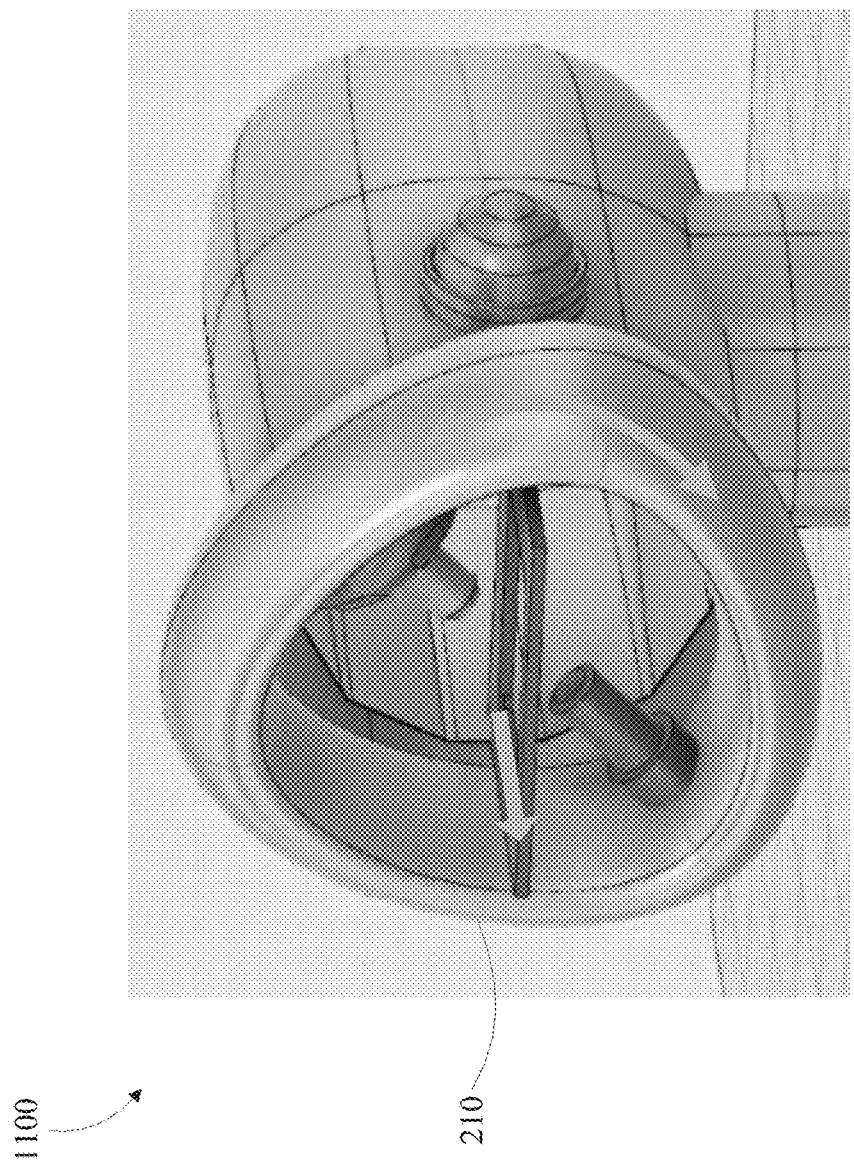
FIG. 11 depicts the dual purpose microscope in transition from upright to inverted state in accordance with an embodiment of the disclosure.

FIG. 11 depicts an example of the spinning carrier ring 210 in a transition state from an upright to an inverted configuration. It is preferred that the gliding rails and the gliding stage not physically contact the carrier ring 210. The gliding stage extends forward during transition from an upright to an inverted configuration.

Figure 12:
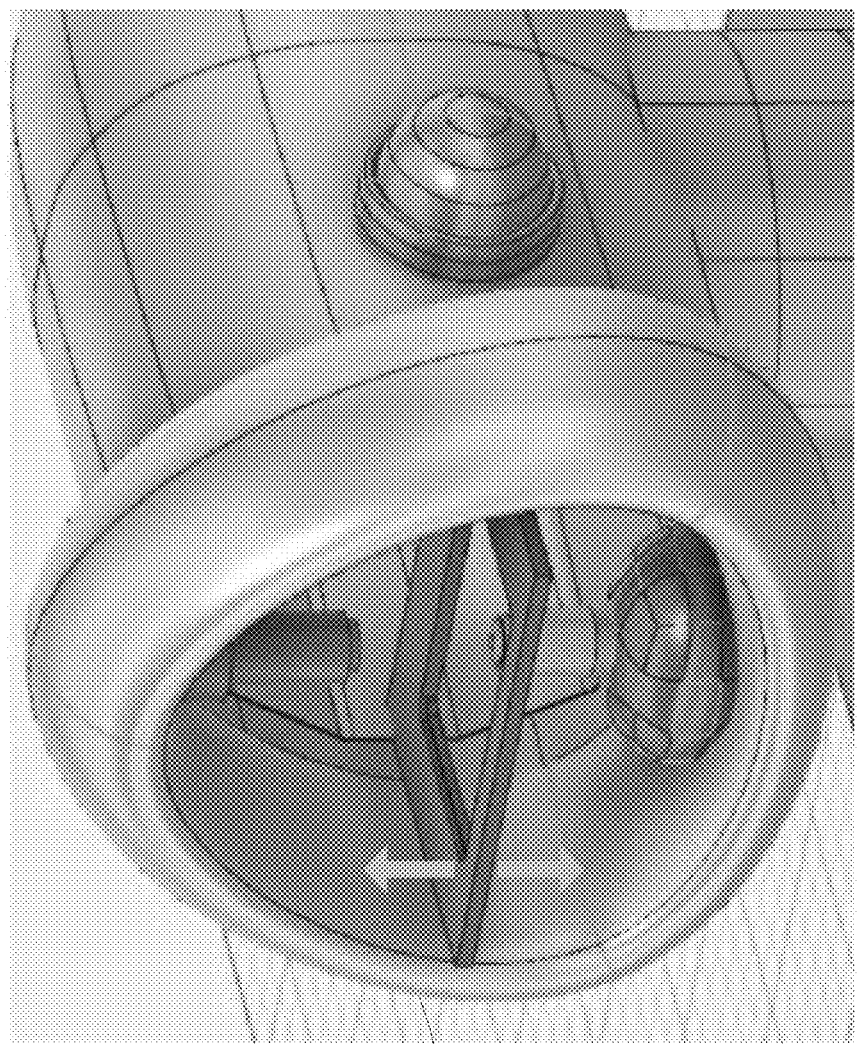
FIG. 12 depicts the dual purpose microscope in an inverted state in accordance with an embodiment of the disclosure.

FIG. 12 depicts an example of the spinning carrier ring 210 in an inverted configuration. The gliding stage adjusts vertically to accommodate working distances of objectives of varying numerical apertures; the attachment node actuates a focus mechanism by providing vertical adjustment.

Figure 13:
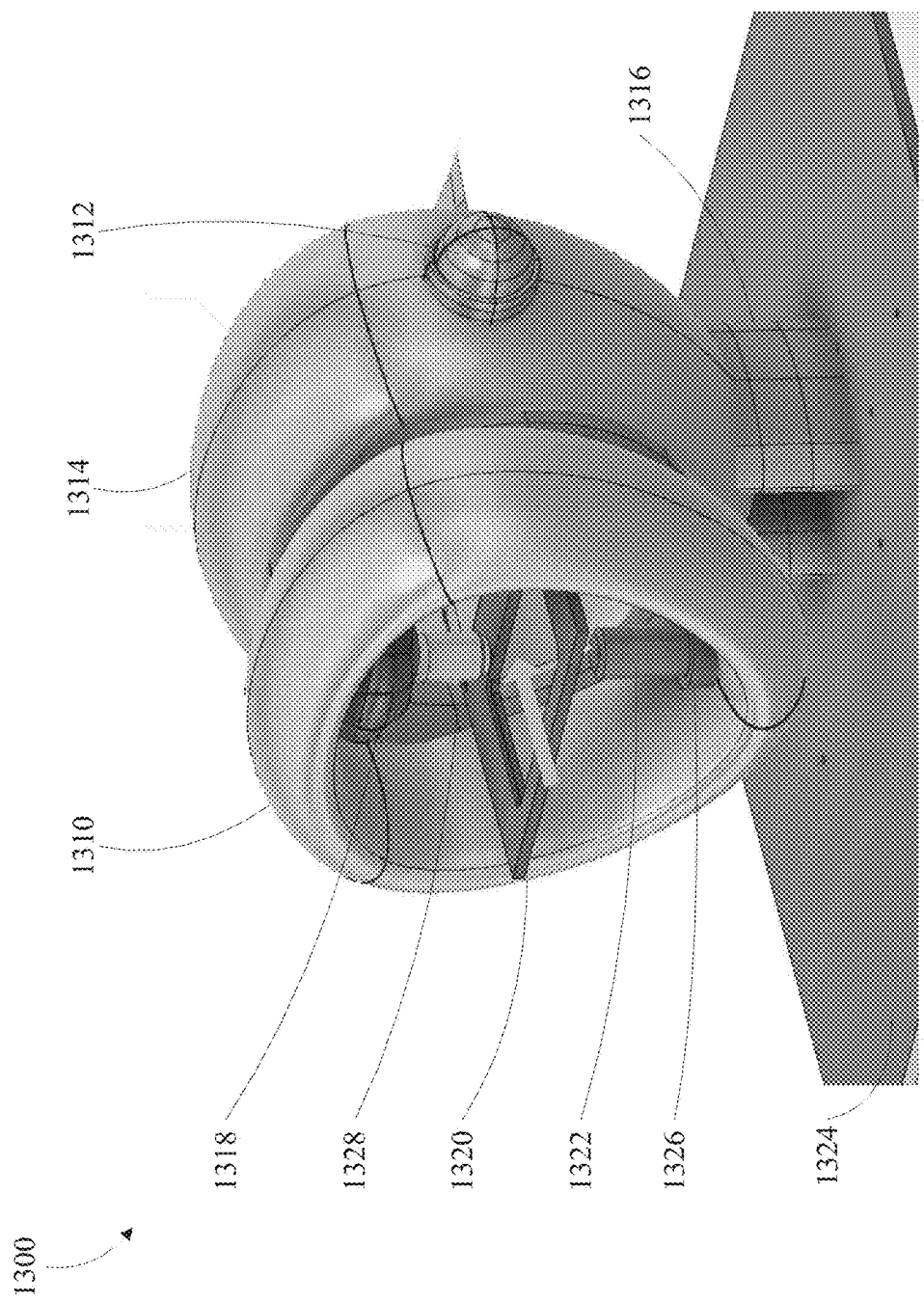
FIG. 13 depicts a perspective view of a dual ring, dual purpose microscope in accordance with an embodiment of the disclosure.

FIG. 13 depicts a double ring example having a carrier ring 1310 that spins and is coupled to an imaging module 1318, an LED light source 1326 and a condenser lens assembly 1322 which are contained within the carrier ring 1310. The carrier ring has the general shape of a torus having an outline of a smooth reuleaux triangular. The outline of the carrier ring may be any closed geometric shape. The LED light source is for bright field inspection. The carrier ring comprises an imaging module, condenser lens and LED and spins to an upright or inverted configuration. The carrier stage 1320 retracts back into the static ring during transition between upright to inverted configuration and vice versa. The device also has a base 1324 and a power base 1316. The static ring 1314 consists of an internal frame assembly and external case with an open back. The static ring contains a vertical control mechanism for focus that is connected to the gliding rails. The attachment nodes 1312 consist of a spherical inner knob and cylindrical outer ring that are positioned on either side of the static ring between the spinning carrier ring 1310 and the power base 1316. The left attachment node connects to the tablet controller and image viewer and the right attachment node actuates the vertical control mechanism for coarse and fine adjustment. The power base 1316 is coupled to a stand 1324. The power base contains controller board power supply. The imaging module 1318 is a self-contained unit that comprises optics, light filters, light sources and cameras or detectors.

In the example of FIG. 13, the imaging module, LED light source and condenser lens assembly may be provided in a single self-contained optics module.

In the example of FIG. 13, the gliding stage may retract into the back of the static ring during reconfiguration.

Figure 14:
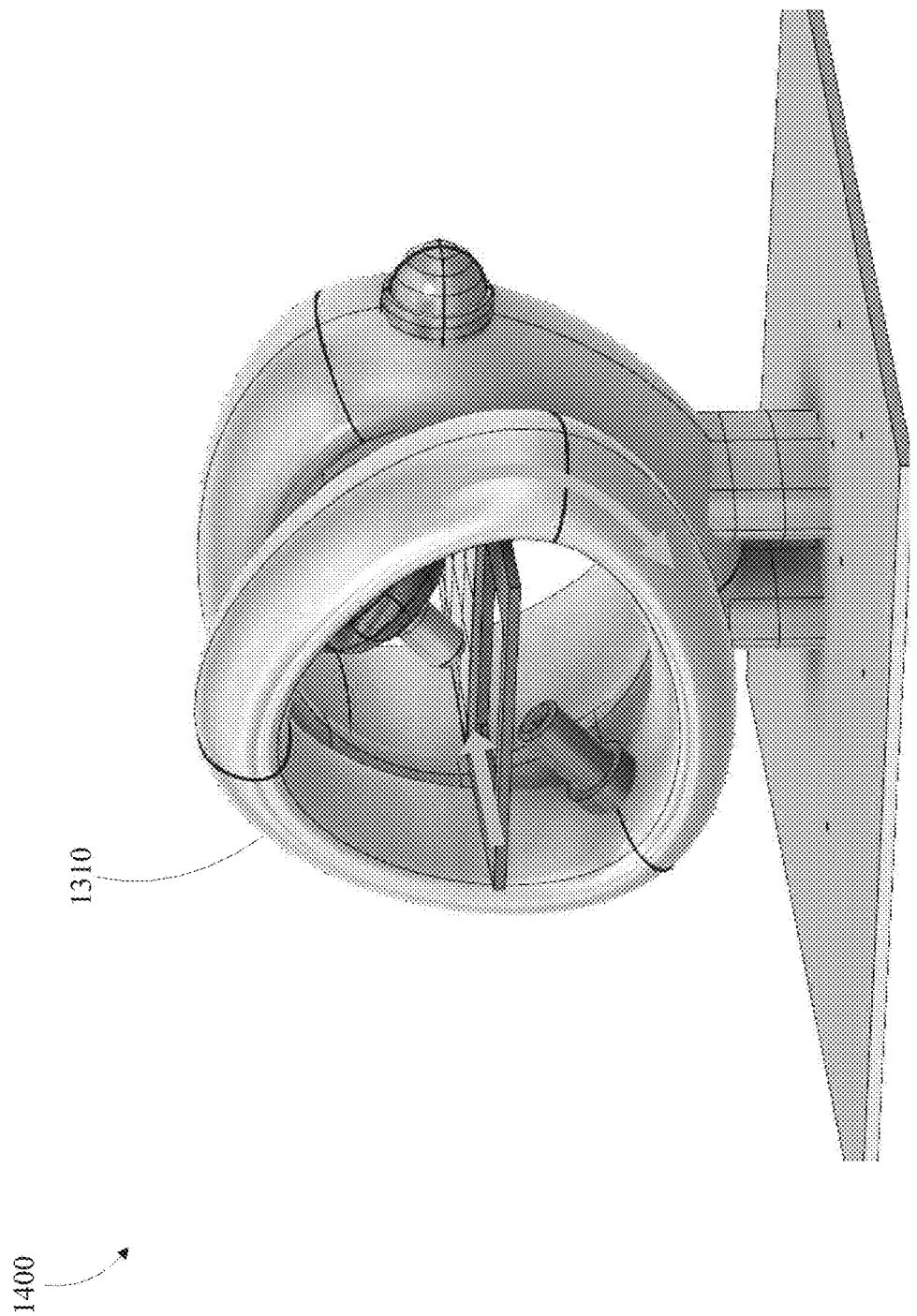
FIG. 14 depicts the dual ring, dual purpose microscope in transition from upright to inverted state in accordance with an embodiment of the disclosure.

FIG. 14 depicts a double ring example having an example of the spinning carrier ring 1310 in a transition state from an upright to an inverted configuration. During reconfiguration the gliding stage slides on the gliding rails and extends out the back of the static ring. The gliding stage slides back on the gliding rails during reconfiguration to permit unobstructed movement of the spinning carrier ring. The flanged coupling comprises complementary flanged ring connectors having an O-ring. The outer flanged ring connector attaches to the carrier ring and the inner flanged ring connector attaches to the static ring. It is preferred that the gliding rails and the gliding stage not physically contact the carrier ring 1310.

Additionally, the sliding stage may have cutouts that allow it to stay stationary while the spinning carrier ring spins about the sliding stage.

Figure 15:
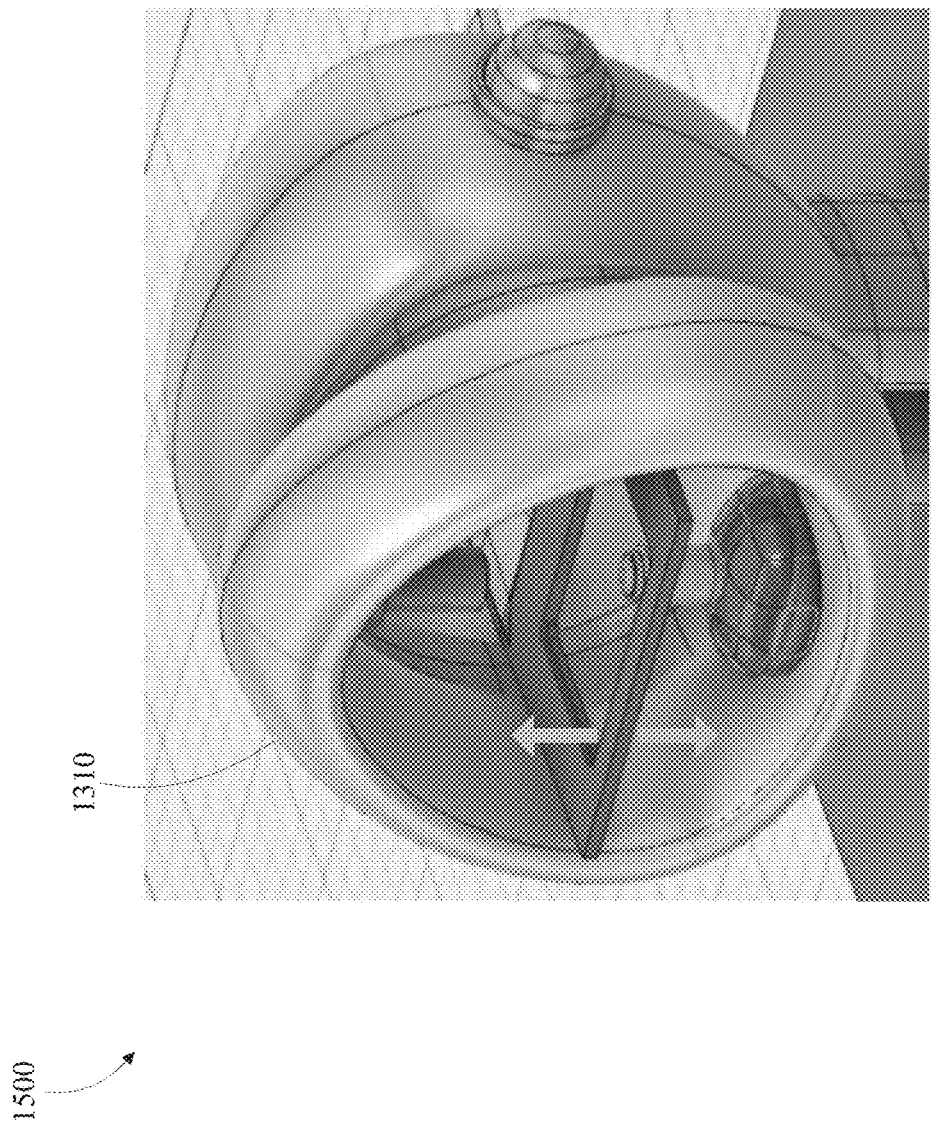
FIG. 15 depicts the dual ring, dual purpose microscope in an inverted state in accordance with an embodiment of the disclosure.

FIG. 15 depicts a double ring example having an example of the spinning carrier ring 1310 in an inverted configuration. The gliding stage adjusts vertically to accommodate working distances of varying numerical apertures. The attachment node actuates a focus mechanism and provides for vertical adjustment of the stage.

Figure 16:
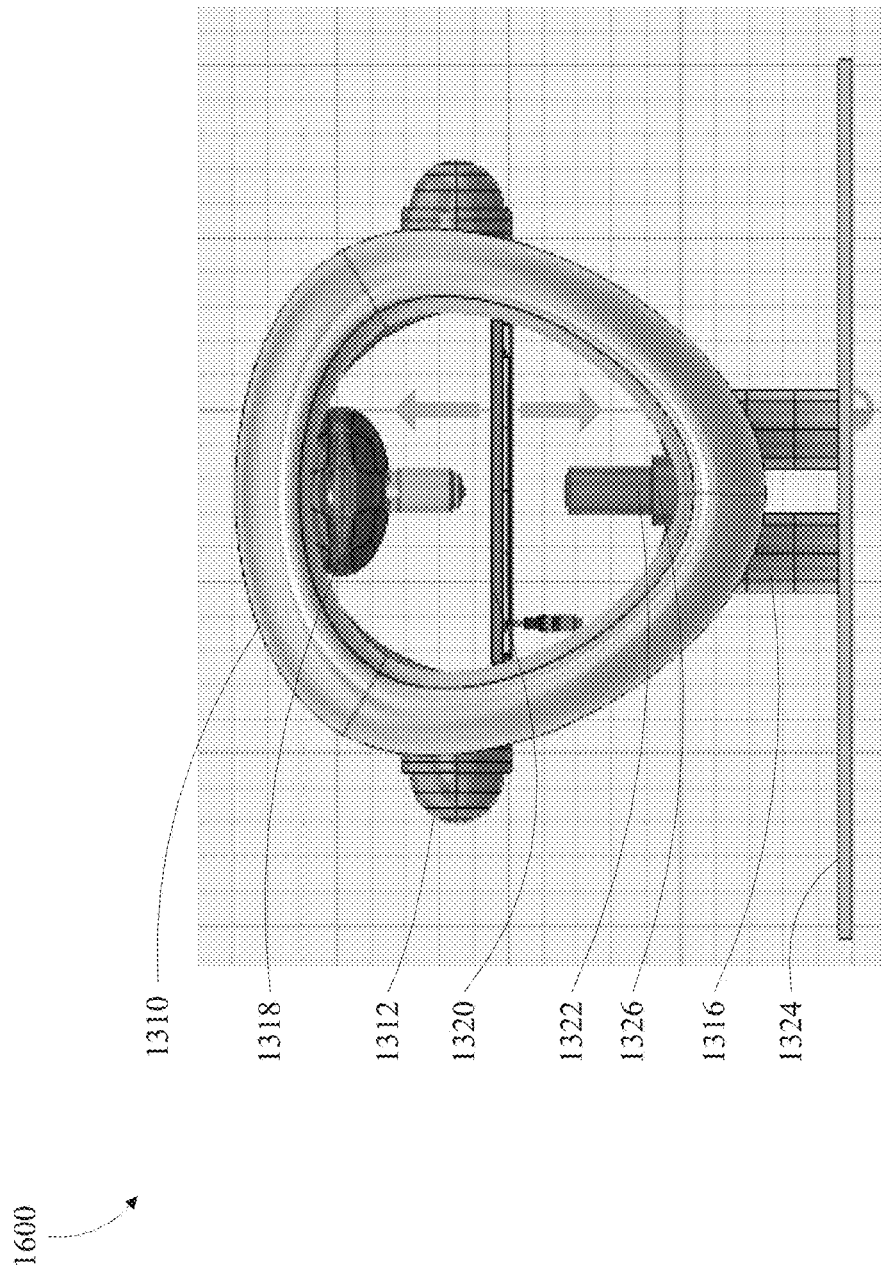
FIG. 16 depicts a front view of a dual ring, dual purpose microscope in accordance with an embodiment of the disclosure.

FIG. 16 depicts a front view of the double ring example having a carrier ring 1310 that spins and is coupled to an imaging module 1318, condenser lens 1322, and an LED light source 1326 contained within the carrier ring. The device also has a base 1324 and a power base 1316. The static ring 1314 consists of an internal frame assembly and external enclosed case with an open back. The static ring contains attachment nodes 1312 that consist of a spherical inner knob and cylindrical outer ring that are positioned on either side of the static ring between the spinning carrier ring and power base.

Figure 17:
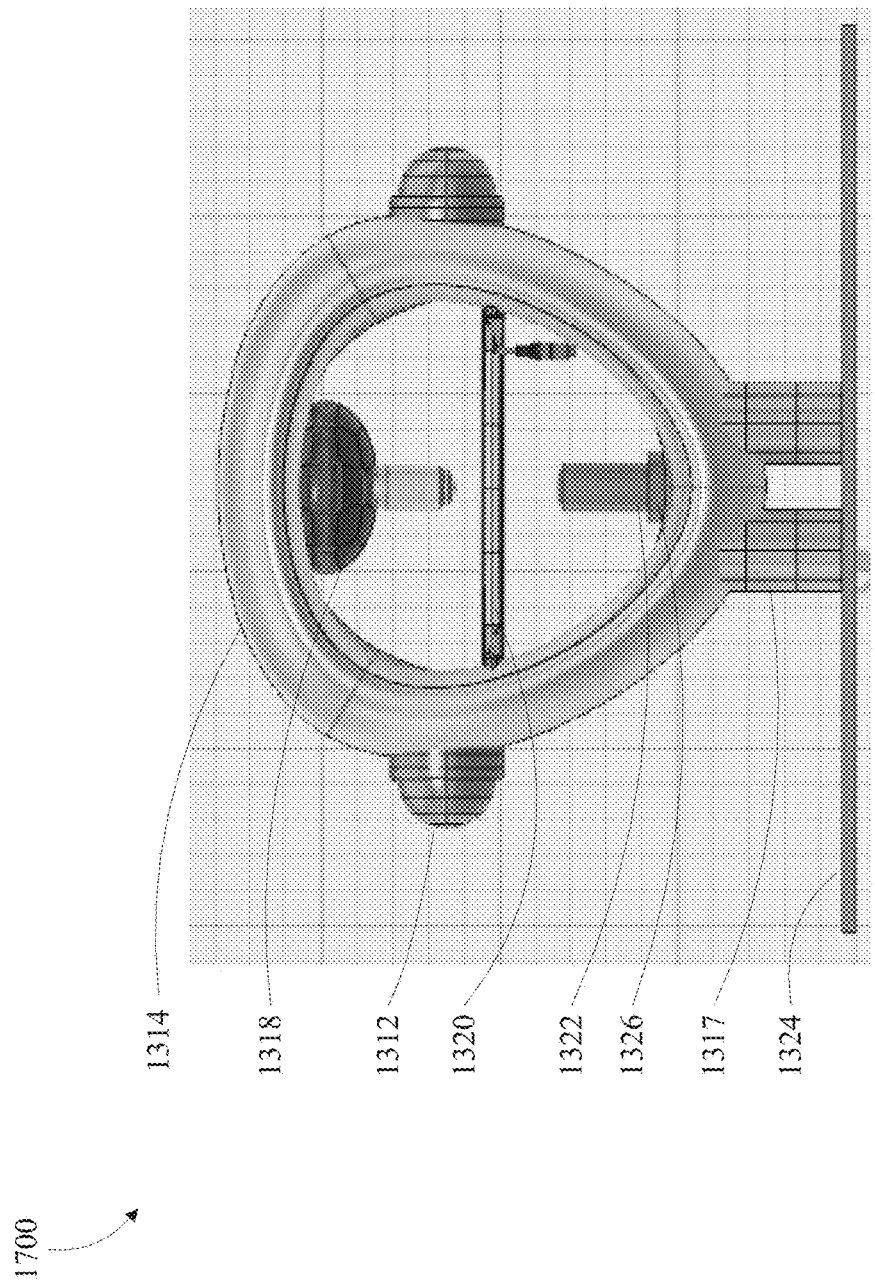
FIG. 17 depicts a rear view of a dual ring, dual purpose microscope in accordance with an embodiment of the disclosure.

FIG. 17 depicts a back view of the double ring example having a carrier ring (hidden from view) that spins and is coupled to an imaging module 1318, condenser lens 1322 and an LED light source 1326 contained within the carrier ring. The device also has a base 1324 and a power base 1316. The static ring 1314 consists of an internal frame assembly and external enclosed case with an open back. The static ring contains attachment nodes 1312 that consist of a spherical inner knob and cylindrical outer ring that are positioned on either side of the static ring between the spinning carrier ring and power base.

Figure 18:
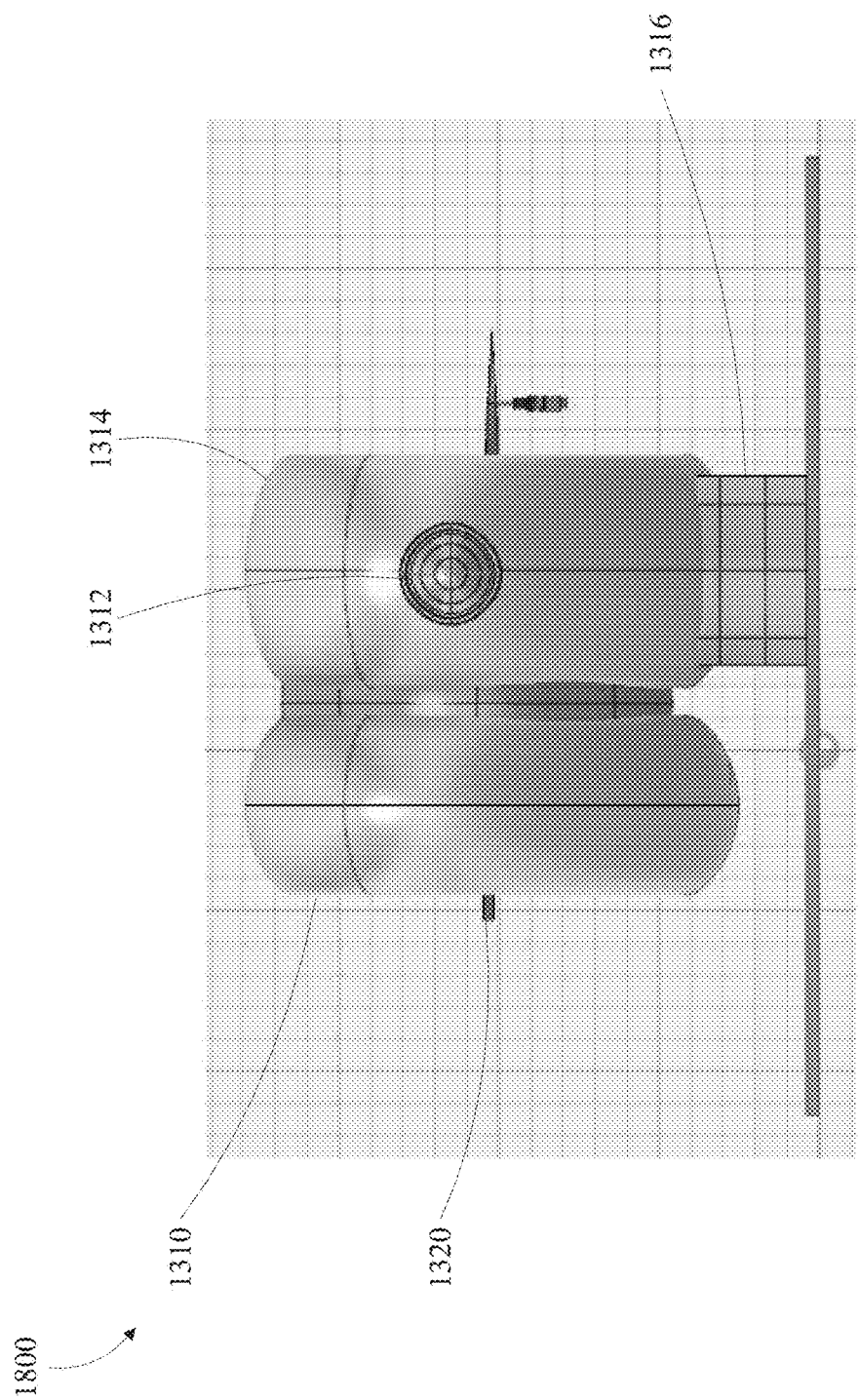
FIG. 18 depicts a side view of a dual ring, dual purpose microscope in accordance with an embodiment of the disclosure.

FIG. 18 shows a double ring example having the device from the side showing the gliding stage 1320, the spinning carrier ring 1310, the attachment nodes 1312, the static ring 1314 and the power base 1316.

Figure 19:
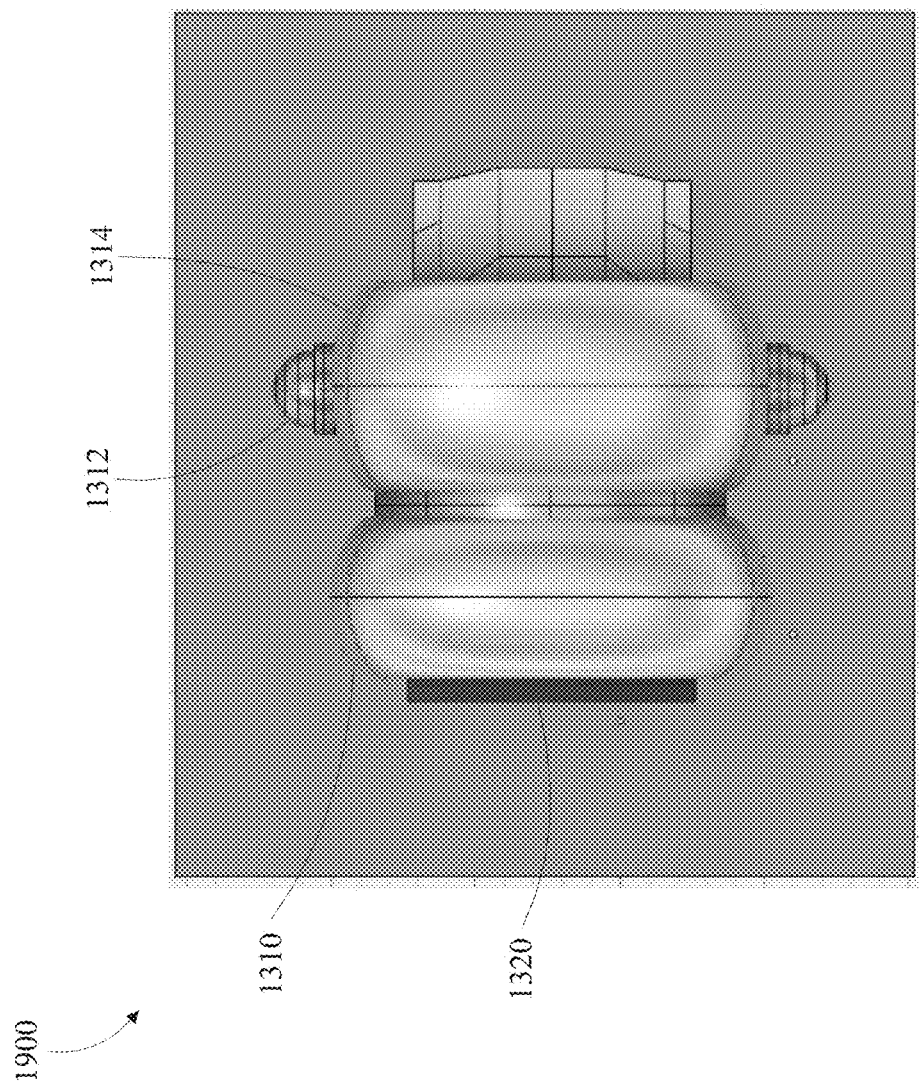
FIG. 19 depicts a top view of a dual ring, dual purpose microscope in accordance with an embodiment of the disclosure.

FIG. 19 shows a double ring example having the device from the top showing the gliding stage 1320, the spinning carrier ring 1310, the attachment nodes 1312 and the static ring 1314.

Figure 20:
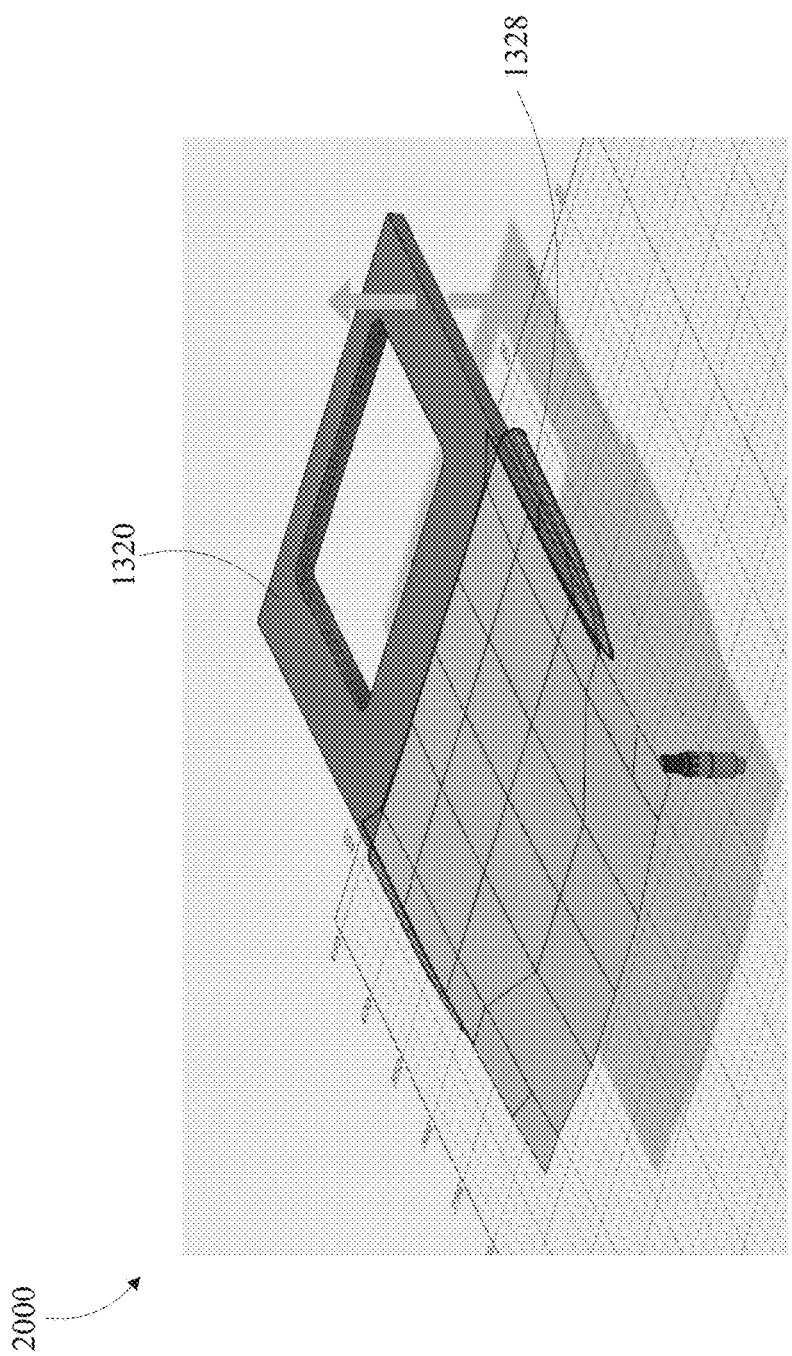
FIG. 20 depicts a gliding stage and gliding rails in accordance with an embodiment of the disclosure.

FIG. 20 depicts an example of the gliding stage 1320 and the gliding rails 1328 with the gliding stage in a retracted state. The gliding stage adjusts vertically to accommodate working distances of objectives of varying numerical apertures. The attachment node actuates a focus mechanism by providing vertical adjustment. The gliding rails comprise sliding dovetail rail guides and are connected to the focus mechanism to provide vertical adjustment for focus.

Figure 21:
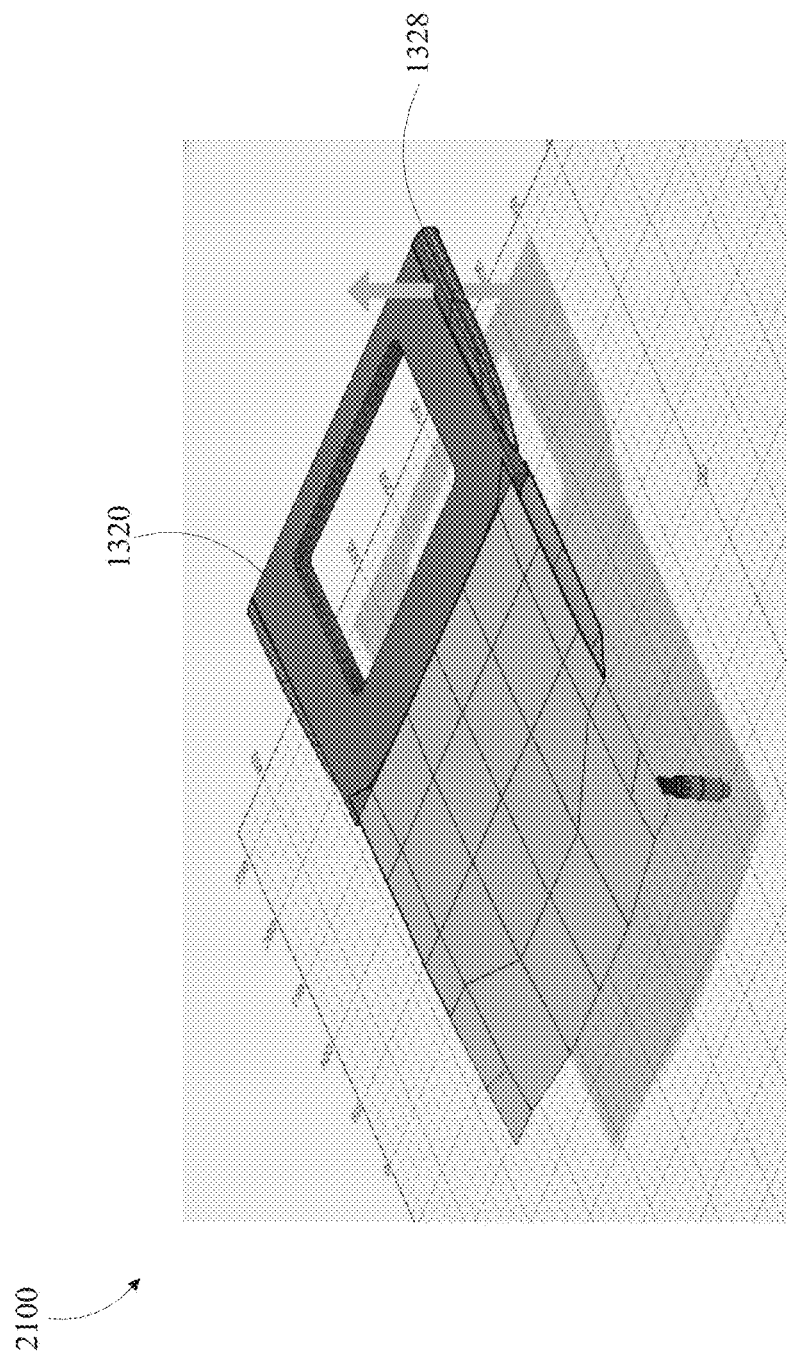
FIG. 21 depicts a gliding stage and gliding rails in accordance with an embodiment of the disclosure.

FIG. 21 depicts an example of the gliding stage 1320 and the gliding rails 1328 with the gliding stage in an extended state. The gliding stage glides horizontally during carrier ring reconfiguration.

FIG. 22 depicts an example of the gliding stage 1320 with oval cutouts to prevent obstruction during the spin of the carrier ring.

FIG. 23 depicts an example of the gliding stage 1320 with rectangular cutouts to prevent obstruction during the spin of the carrier ring.

FIG. 24 depicts an example of the dovetail of the gliding stage 1328.

FIG. 25 depicts a method of microscopy 2500 that comprises receiving 2510 an optical signal from a microscope, adjusting 2512 a microscope configuration to at least one of an upright and inverted configuration and adjusting 2514 a microscope focus.

In some embodiments, the gliding stage can have cutouts, to allow scanning of specimens at different angles without needing to remove and reinsert the gliding stage. In particular, the gliding stage of FIG. 22, with oval cutouts, can be advantageously used in this configuration, by allowing microscopy at a desired angle. Other cutout shapes, such as that of FIG. 23, can also be used.

The gliding stage can allow rotation of the microscope at different angles, by allowing unobstructed motion through the cutouts. For example, the condenser lens and the objective turret coupled to the carrier ring can rotate and move through the cutouts. In these embodiments, the size of the cutouts is configured to allow unobstructed movement (rotation) of the protruding parts of the rotating section. For example, the cutouts will have a width and length greater than those of the protruding parts which are rotating, such as the condenser lens (1322) in FIG. 16, or the objective turret.

The method described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

EQUIVALENTS, EXTENSIONS, ALTERNATIVES AND MISCELLANEOUS

Example embodiments that relate to dual purpose microscopes are thus described. In the foregoing specification, embodiments of the present disclosure have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A microscope comprising:
   a unibody core having a unibody front and a unibody side;
   a carrier ring rotatably coupled to said unibody front to rotate components from an upright to an inverted configuration, wherein said carrier ring has the general form of a torus;
   an objective turret coupled within said carrier ring;
   a condenser lens coupled within said carrier ring;
   gliding rails coupled to said unibody core;
   a gliding stage extensibly coupled to said gliding rails; and
   an attachment node coupled to said unibody side and moveably coupled to said gliding rails to modulate said gliding stage.

2. The microscope of claim 1, further comprising a light emitting diode coupled within said carrier ring.

3. The microscope of claim 1, further comprising a power base coupled to said unibody core and comprising a controller board and power supply.

4. The microscope of claim 1, further comprising a filter cube coupled to said unibody core.

5. The microscope of claim 1, further comprising a light cube coupled to said unibody core.

6. The microscope of claim 1, further comprising a light guide coupled to said unibody core.

7. The microscope of claim 1, further comprising a camera coupled to said unibody core.

8. The microscope of claim 1, further comprising a detector coupled to said unibody core.

9. The microscope of claim 1, wherein said gliding stage displaces horizontally.

10. The microscope of claim 1, further comprising a slide holder to accommodate a well plate adapter.

11. The microscope of claim 1, wherein the gliding stage comprises a first cutout on a first side coupled to the gliding rails, and a second cutout on a second side coupled to the gliding rails and opposite to the first side, the first and second cutouts configured to allow unobstructed rotation of the condenser lens and of the objective turret.

12. The microscope of claim 11, wherein the first and second cutouts are oval.

13. The microscope of claim 11, wherein the first and second cutouts are rectangular.

14. A method of microscopy comprising:
   providing a microscope comprising:
      a unibody core having a unibody front and a unibody side;
      a carrier ring rotatably coupled to said unibody front to rotate components from an upright to an inverted configuration, wherein said carrier ring has the general form of a torus;
      an objective turret coupled within said carrier ring;
      a condenser lens coupled within said carrier ring;
      gliding rails coupled to said unibody core;
      a camera coupled to said unibody core;
      a gliding stage extensibly coupled to said gliding rails, the gliding stage having a first cutout on a first side coupled to the gliding rails, and a second cutout on a second side coupled to the gliding rails and opposite to the first side, the first and second cutouts configured to allow unobstructed rotation of the objective turret and of the condenser lens; and
      an attachment node coupled to said unibody side and moveably coupled to said gliding rails to modulate said gliding stage;
   receiving an optical signal from a microscope;
   adjusting a microscope configuration to at least one of an upright and inverted configuration, wherein adjusting a microscope configuration comprises rotating the carrier ring and unobstructedly rotating the objective turret and the condenser lens through the first and second cutouts; and
   adjusting a microscope focus.

15. The method of claim 14, wherein said optical signal is received through at least one of a wired, wireless and an optical connection.

16. The method of claim 14, further comprising adjusting a gliding stage as part of said adjusting said microscope configuration.

17. The method of claim 14, wherein said microscope focus is coarse.

18. The method of claim 14, wherein said microscope focus is fine.

19. The method of claim 14, further comprising changing a microscope zoom.

20. The method of claim 14, wherein said method is performed utilizing a computer.

* * * * *